Nov. 28, 1944.  A. J. L. HUTCHINSON  2,363,529
FRACTIONATION OF HYDRATE-FORMING HYDROCARBONS
Filed May 6, 1941
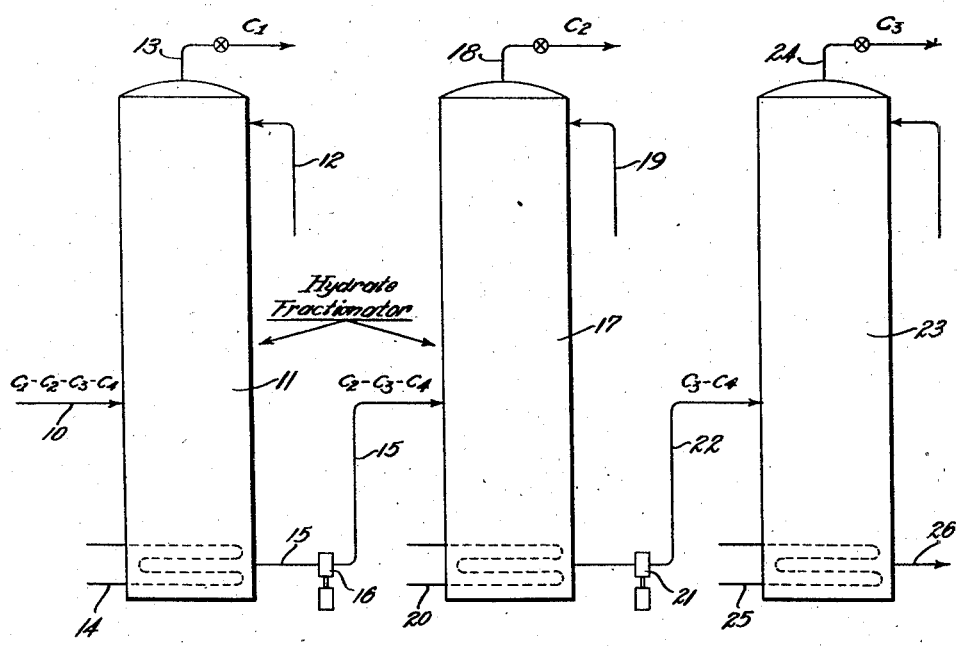
Inventor
ARTHUR J. L. HUTCHINSON
H. Calvin White
Attorney Patented Nov. 28, 1944

2,363,529

UNITED STATES PATENT OFFICE 2,363,529

FRACTIONATION OF HYDRATE-FORMING HYDROCARBONS

Arthur J. L. Hutchinson, Los Angeles, Calif., assignor to The Fluor Corporation, Ltd., Los Angeles, Calif., a corporation of California Application May 6, 1941, Serial No. 392,186

12 Claims. (Cl. 260—676)

This invention relates generally to the treatment of natural or other hydrate-forming hydrocarbon gases, and primarily to the fractionation or separation of such gases into their constituents including fixed or normally uncondensible gases, as well as hydrocarbon fractions. Ordinary natural or hydrocarbon gases of the type herein contemplated for treatment, may contain some or all of certain fixed gases such as nitrogen, oxygen, helium, carbon dioxide, and sulphur dioxide, in addition to their bulk constituency of hydrocarbon gases or vapors from methane through ethane, propane, the butanes, and possibly some pentane, as well as the unsaturated series. Although applicable generally to the treatment of all hydrate-forming gases, the invention will be described typically with reference to the treatment of natural gas.

In the past, natural gas has been fractionated by various specific methods, at least the vast majority of which have operated on the general principles of subjecting the constituents of the gas in one or more stages or zones to different temperature or pressure conditions, different combinations of temperature and pressure, also to the chemical or physical action of treating agents, as well as simple physical separation, all depending upon the particular constituent or fraction of the gas to be separated. A common characteristic of the usual fractionating methods is that except by resorting to expensive equipment and relatively complex systems for fractionation, a sharp or well-defined separation cannot be had, for example, between fixed gases of the kind mentioned above and the lower molecular weight hydrocarbons, or between successive hydrocarbons in the order of their molecular weights or volatilities. This difficulty is due mainly to such mutual effects, unnecessary to detail in theory, as vapor pressures, closely related boiling temperatures, solubilities, and physical admixtures, that render it extremely difficult to accomplish definite fractionation.

To illustrate, in attempting to fractionate by partial condensation a gas containing methane and ethane, it has not been practicably possible, or at least commercially feasible, to condense or maintain all the ethane in liquid phase, and separate all the methane in vapor phase. Some of the ethane is present in vapor form in the methane, and some of the methane exists in solution in the liquid ethane. For purposes of later comparison, I refer to the approximate equilibrium constants of methane and ethane, and their ratios. The equilibrium constant (K) at 35° F. and 350 lbs. per sq. in., absolute, is identified as follows:

$$K_1 \text{ (methane)} = \frac{\text{molecular \% in vapor}}{\text{molecular \% in liquid}} = 8.5$$

$$K_2 \text{ (ethane)} = 0.95$$

Equilibrium constant ratio $\frac{K_1}{K_2} = 8.95$

The present invention provides a method of relatively precise fractionation by utilizing the property of hydrocarbon constituents of the gas to form hydrates, i. e. water-addition products, of extremely low vapor pressure, and the ready feasibility of selectively converting a particular hydrocarbon or group of hydrocarbons into their hydrates, and separating from such hydrates any non-hydrated constituents, including fixed gases. When contacted with water under proper and controlled pressure and temperature conditions, the hydrocarbons in the gas may entirely or selectively be converted into their solid hydrates, thereby holding the normally volatile and therefore high vapor pressure hydrocarbons in a state of combination with water. In the hydrates thus formed, the hydrocarbon component vapor pressures are so extremely low as to permit correspondingly complete separation between the hydrated compounds and any non-hydrated constituents of the gas. The effect, in this respect, of converting the hydrocarbons into their solid hydrates, will be seen from the following solid-vapor phase equilibrium constants, and their relation to the corresponding liquid-vapor phase equilibrium constants given above.

The approximate equilibrium constants (Km) for the methane and (Ke) ethane hydrates at 350 lbs. per sq. in., absolute, and 35° F., are:

$$Km = \frac{\text{molecular \% in vapor}}{\text{molecular \% in solid}} = 1.55$$

$$Ke = 0.055$$

Equilibrium constant ratio $\frac{Km}{Ke} = 28.2$

Showing thus a ratio of 28.2 between the equilibrium constants for solid methane and ethane hydrates, as against a corresponding ratio of 8.95 between the equilibrium constants for liquid methane and ethane, the possibility of securing far greater precision in fractionation between hydrated (e. g. solid) and non-hydrated (e. g. gaseous) hydrocarbons than between two (e. g. one liquid and the other gaseous) non-hydrated hydrocarbons, becomes readily apparent. At this point it may be mentioned that the invention broadly contemplates methods of fractionation or separation between hydrated and non-hydrated constituents of the gas, whatever may be the physical form, condition or phase of such constituents. Broadly, the separation will occur between hydrates and gaseous or liquid non-hydrated constituents. As will later appear, it is contemplated, particularly where a liquid hydrate carrier is used, that instead of being entirely in solid form, the hydrates may exist at least partially in solution, though chemically in their characteristic compositions as water-addition products.

With the description prefaced by the above explanation of certain important physical and chemical differences in the form and properties of natural gas constituents undergoing fractionation on the one hand, in liquid-gas or vapor phases, as against fractionation between hydrated and non-hydrated compositions, the invention now can be explained further and to better advantage by reference to a typical and illustrative system, shown in the accompanying drawing, for carrying out the methods contemplated by the invention.

Referring to the drawing, it may be assumed that natural gas containing hydrocarbon constituents of the series of methane, ethane, propane, and the butanes, designated respectively as $C_1$, $C_2$, $C_3$, and $C_4$, is supplied through line 10 to the fractionator 11 which may consist of any suitably formed zone or chamber for bringing the gas into contact with water under conditions resulting in the conversion of the gaseous hydrocarbons to their solid hydrates. Typically, the fractionator 11 is shown to consist of a vertically extended column or tower which may contain any suitable means, not shown, for bringing the rising gas stream introduced through line 10 into intimate contact with water introduced to the upper interior of the column through line 12. Preferably, the water is thus introduced together with a non-aqueous carrier for the hydrates, such as a mineral oil fraction, typically kerosene. It will be understood that I may use any suitable non-aqueous carrier liquid in which the hydrates, as such, may or may not be soluble. Kerosene may be regarded as preferred by reason of its ready availability, low cost, and ease of handling.

While the water and hydrate carrier may be separately introduced to the column, the two desirably may be combined because of the possibility of utilizing the carrier liquid as a means of securing fine particle dispersion of the water and in a condition suitable for efficient contacting and conversion of the gaseous hydrocarbons into their hydrates. Accordingly, the water-kerosene mixture introduced through line 12, first may be emulsified to secure proper dispersion of the water particles in the carrier. It will be understood that the rate at which water is thus introduced to the hydrate forming zone will be sufficient to convert into their hydrates all the hydrocarbons that are to be hydrated at this stage in the process, and that the rate of carrier liquid input will be sufficient to conduct the formed hydrates from the first to the second fractionating stage, as will presently appear.

The hydrate forming zone in column 11 may be maintained under temperature and pressure conditions at which the ethane, propane, and butane hydrates will form, while maintaining for example the pressure, sufficiently low to prevent formation of the methane hydrate. In other words, the pressure and temperature may be maintained below a combination of pressure and temperature conditions at which the methane hydrate can exist in a pure state. Typically, at a temperature of 35° F., the pressure may be about 350 lbs. per sq. in., absolute. Under these conditions, intimate admixture of the gas introduced through line 10 with the finely dispersed water particles in the carrier liquid fed through line 12, results in the formation of small crystals (due to fine dispersion of the water) of ethane, propane, and the butane hydrates. It should be mentioned that, if desired, the quantity or rate of water supply to the column 11 may be limited so that the water will be present in sufficient quantities to form the ethane, propane, and butane hydrates, but not necessarily the methane hydrate, or any considerable amounts thereof. As a result of this selective hydration of the hydrocarbons, gaseous methane may be separated from the higher molecular weight hydrocarbons, and withdrawn through the valved line 13. The solid hydrate crystals are washed down by the carrier liquid into the base of the column, wherein the mixture may be suitably heated, as by a heated fluid passed through coil 14, to insure separation from the hydrated compounds of all non-hydrated constituents of the gas, as well as any dissolved methane hydrates.

The hydrate-carrier liquid mixture may be taken through line 15 from the base of column 11 and discharged by pump 16 into a second column or hydrate fractionator 17, wherein the ethane hydrate is dissociated to release the ethane for separation from propane and the butanes still remaining in hydrated form. The pressure and temperature conditions maintained in column 11 preferably are such that ethane hydrate cannot exist pure, and will dissociate into water and ethane gas, the latter being removed from the column through the valved line 18. Typically, column 17 may be maintained under a pressure of about 70 lbs. per sq. in. absolute, and at a temperature of around 35° F. If necessary, additional carrier liquid may be introduced to the column through line 19, with or without emulsified water. As in the operation of column 11, the hydrate and carrier liquid mixture accumulating in the base of column 17 may be heated by coil 20 to assure vaporization of ethane or other non-hydrated constituents of the gas, as well as any dissolved ethane hydrates.

From column 17, the carried liquid and its contained propane and butane hydrates may be discharged by pump 21 through line 22 into a third fractionating column 23, wherein the maintained pressure and temperature, e. g. 30 lbs. per sq. in. absolute, and 35° F., will cause dissociation of the propane hydrate to form water and gaseous propane which is separately removed through the valved line 24. As in the previous instances, the column may have a base heating coil 25 and a draw-off line 26 through which the carrier liquid and butane hydrates are removed. As will be understood, the latter mixture may be similarly treated in additional fractionating zones to secure separation of the butane hydrates in vapor phase.

In the foregoing description of the process, it has been assumed that the gas introduced to the initial fractionating column 11, consists of hydrocarbons including methane through the butanes. In practice, the starting gas may also contain fixed gas constituents such as nitrogen, oxygen and helium. Any non-hydrocarbon, hydrate forming gases may initially be converted into their hydrates and later removed at one or more subsequent fractionating stages, depending upon the nature and properties of such hydrates. Where it is desired to first fractionate these fixed gases from the hydrocarbons, column 11 may serve the purpose of a first-stage fractionator for removing fixed gases. In this instance, the column may be maintained under sufficiently high pressure, say in excess of 450 lbs. per sq. in. absolute, that all the hydrocarbons capable under such conditions of forming hydrates, and inclusive of methane, will be converted to their solid hydrates, leaving all fixed and non-hydrated constituents of the gas to be removed through line 13. Column 17 then may serve as a fractionating zone within which the methane hydrate undergoes dissociation and the released methane separated from the hydrocarbons remaining in hydrated form. Thereafter, ethane, propane, and butane gases individually may be fractionated by sequential dissociation of the hydrates in successive stages, all as previously explained.

Instead of introducing non-hydrated gas to the initial fractionating stage 11, the hydrocarbons in the gas to be fractionated, first may have been converted partially or entirely to their hydrate forms, in which event the stream introduced through line 10 will include pre-formed hydrates preferably in a stream of kerosene or other suitable carrier liquid. Thereafter, initial fractionation will occur in column 11 as explained in the foregoing.

The more specific aspects of the described processes involving hydration of vapors in a hydrate-vapor mixture within a fractionating zone by the introduction of water to the vapor stream, are particularly dealt with in my application Ser. No. 465,677, filed November 16, 1942, on Fractionation treatment of hydrates.

I claim:

1. The process of fractionating hydrate-forming components of a gaseous mixture, that includes contacting the gas with water in a hydrate-forming zone maintained under temperature and pressure conditions at which said components are converted into their relatively low vapor pressure hydrates, passing the hydrates from said zone into a second zone maintained under temperature and pressure conditions causing partial dissociation of the hydrates, and removing the resulting gas from said second zone and from the components remaining in hydrated form.

2. The process of fractionating hydrate-forming components of a gaseous mixture, that includes continuously contacting the gas with water in a hydrate-forming zone maintained under temperature and pressure conditions at which said components are converted into their relatively low vapor pressure hydrates, continuously passing the hydrates from said zone into a second zone maintained under temperature and pressure conditions causing partial dissociation of the hydrates, and continuously removing the resulting gas from said second zone and from the components remaining in hydrated form.

3. The process of fractionating hydrate-forming components of a gaseous mixture, that includes contacting the gas with water in a hydrate-forming zone maintained under temperature and pressure conditions at which said components are converted into their relatively low vapor pressure hydrates, passing the hydrates from said zone into a second zone maintained under temperature and pressure conditions causing partial dissociation of the hydrates, removing the resulting gas from said second zone and from the components remaining in hydrated form, transferring the remaining hydrates from said second zone into a third zone maintained under different combination temperature and pressure conditions causing partial dissociation of the hydrates in said third zone, and removing the resulting gas from said third zone and from the remaining hydrates.

4. The process of fractionating hydrate-forming hydrocarbon components of a gaseous mixture, that includes contacting the gas with water in a hydrate-forming zone maintained under temperature and pressure conditions at which said components are converted into their relatively low vapor pressure hydrates, passing the hydrates into a second zone maintained under temperature and pressure conditions causing partial dissociation of the hydrates and vaporization of a relatively low molecular weight hydrocarbon, removing the resulting hydrocarbon from said second zone and from hydrocarbons remaining in hydrated form, transferring the remaining hydrates from said second zone into a third zone maintained under different combination temperature and pressure conditions causing further partial dissociation of the hydrates and vaporization of a higher molecular weight hydrocarbon, and removing said higher molecular weight hydrocarbon from said third zone and from the remaining hydrates.

5. The process of fractionating hydrate-forming components of a gaseous mixture, that includes contacting the gas with water in a hydrate-forming zone maintained under temperature and pressure conditions at which said components are converted into their relatively low vapor pressure solid hydrates, transferring the hydrates in a stream of carrier liquid into a second zone maintained at temperature and pressure conditions causing partial dissociation of the hydrates and release of vapors, and separately withdrawing the resulting vapors and remaining hydrates from said second zone.

6. The process of fractionating hydrate-forming components of a gaseous mixture, that includes contacting the gas with water in the presence of water-immiscible carrier liquid in a hydrate-forming zone maintained under temperature and pressure conditions at which said components are converted into their relatively low vapor pressure solid hydrates, transferring the hydrates in a stream of said carrier liquid into a second zone maintained at temperature and pressure conditions causing partial dissociation of the hydrates and release of vapors, and separately withdrawing the resulting vapors and remaining hydrates from said second zone.

7. The process of fractionating hydrate-forming components of a gaseous mixture, that includes contacting the gas with water in a hydrate-forming zone maintained under temperature and pressure conditions at which said components are converted into their relatively low vapor pressure solid hydrates, transferring the hydrates in a stream of mineral oil carrier liquid into a second zone maintained at temperature and pressure conditions causing partial dissociation of the hydrates and release of vapors, and separately withdrawing the resulting vapors and remaining hydrates from said second zone.

8. The process of fractionating a mixture of normally gaseous solid hydrate compounds of different molecular weights, that includes passing said mixture into a first fractionating zone under temperature and pressure conditions at which the hydrates undergo partial dissociation to release vapor, removing the resulting vapor and passing the remaining hydrates into a second fractionating zone under temperature and pressure conditions different from the first fractionating zone and at which the hydrates undergo further dissociation to release vapors, and separately removing the vapors and remaining hydrates from said second zone.

9. The process of fractionating a mixture of solid hydrates of normally gaseous compounds having different molecular weights, that includes passing said mixture into a first fractionating zone under temperature and pressure conditions at which the hydrates undergo partial dissociation to release vapor of a lower molecular weight fraction, removing the resulting vapor and passing the remaining hydrates into a second fractionating zone under temperature and pressure conditions different from the first fractionating zone and at which the hydrates undergo further dissociation to release vapor of a higher molecular weight fraction, and separately removing the vapors and remaining hydrates from said second zone.

10. The process of fractionating a mixture of the solid hydrates of different normally gaseous compounds, that includes passing said mixture into a first fractionating zone under temperature and pressure conditions at which the hydrates undergo partial dissociation to release vapors, introducing carrier liquid to said zone, removing the vapors therefrom and transferring the residual hydrates from said zone in a stream of said carrier liquid into a second fractionating zone under temperature and pressure conditions different from the first mentioned zone and under which the hydrates undergo further partial dissociation to release vapors, and separately removing the vapors and remaining hydrates from said second zone.

11. The process of fractionating hydrate-forming components of a gaseous mixture, that includes contacting the gas with water in a hydrate-forming zone maintained under temperature and pressure conditions at which said components are converted into their relatively low vapor pressure hydrates, passing the hydrates into a vertically extending fractionating zone under temperature and pressure conditions causing partial dissociation of the hydrates and release of vapors rising within said zone, contacting the rising vapors with a down-flowing stream of carrier liquid, removing the vapors from said fractionating zone, and removing the residual hydrates therefrom in a stream of said liquid.

12. The process of fractionating hydrate-forming components of a gaseous mixture, that includes contacting the gas with water in a hydrate-forming zone maintained under temperature and pressure conditions at which said components are converted into their relatively low vapor pressure hydrates, passing the hydrates into a vertically extending fractionating zone under temperature and pressure conditions causing partial dissociation of the hydrates and release of vapors rising within said zone, contacting the rising vapors with a down-flowing stream of carrier liquid, supplying heat to a mixture of said liquid and residual hydrates in the lower portion of said fractionating zone, removing the vapors from said fractionating zone, and removing the residual hydrates therefrom in a stream of said liquid.

ARTHUR J. L. HUTCHINSON.